United States Patent

[11] 3,538,891

| [72] | Inventor | Richard R. Williams |
| | | Memphis, Nebraska 68042 |
| [21] | Appl. No. | 790,106 |
| [22] | Filed | Jan. 9, 1969 |
| [45] | Patented | Nov. 10, 1970 |

[54] ANIMAL OILER
10 Claims, 5 Drawing Figs.

| [52] | U.S. Cl. | 119/157 |
| [51] | Int. Cl. | A01k 29/00 |
| [50] | Field of Search | 119/157, 156, 159 |

[56] References Cited
UNITED STATES PATENTS
1,237,784  8/1917  Hurff ..........................  119/157

2,020,063  11/1935  Kalina .........................  119/156
FOREIGN PATENTS
779,581  7/1957  Great Britain ................  119/157

*Primary Examiner*—Hugh R. Chamblee
*Attorney*—Henderson and Strom

ABSTRACT: This invention relates to an animal oiler comprising a frame member having a tank mounted on the upper portion thereof and rubbing posts pivotally and rotatably mounted on the sides thereof. Distributing pipes having normally closed valves connected thereto extend downwardly from the reservoir. A trough having spaced openings formed therein is disposed below the valves. Means linking the posts and the valves are provided to open the valves when the posts are pivoted from their normal position.

Patented Nov. 10, 1970

INVENTOR.
RICHARD R. WILLIAMS
BY
Henderson & Strom
ATTORNEYS

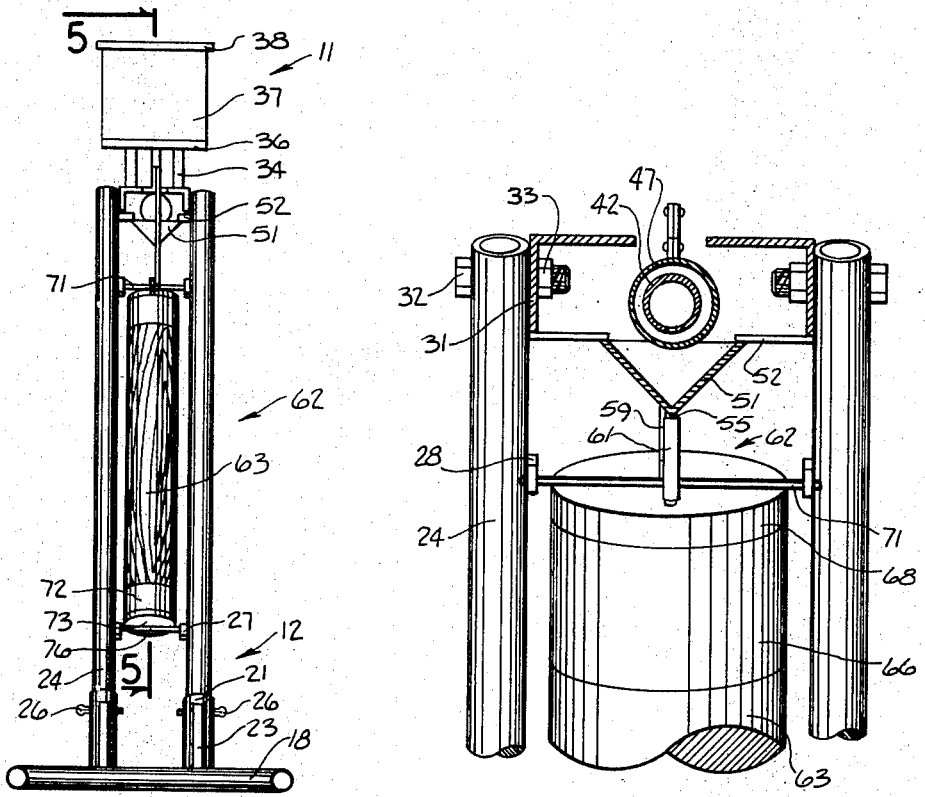
FIG. 3
FIG. 4
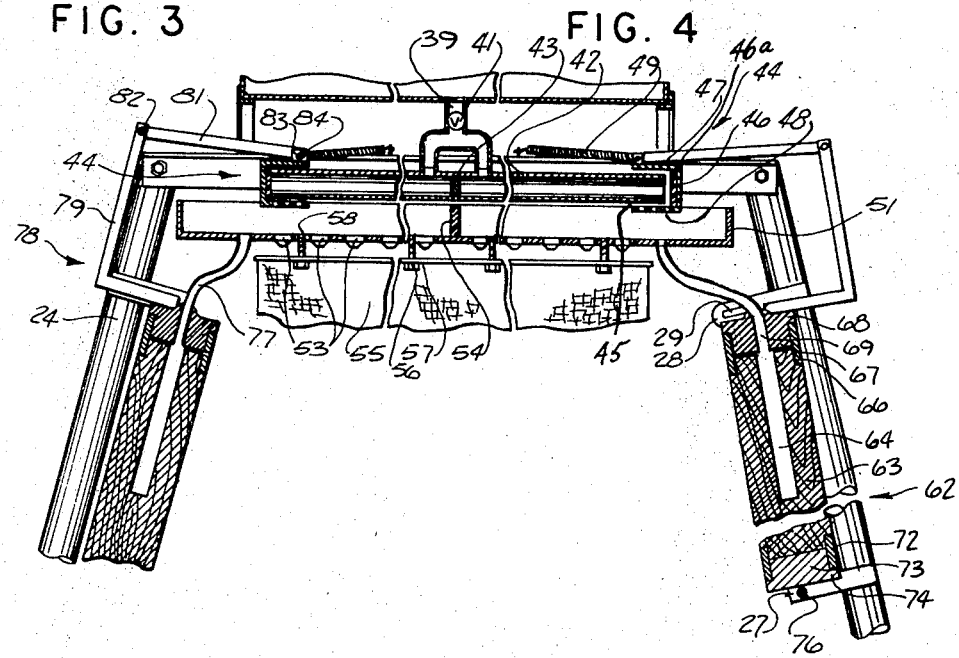
FIG. 5
INVENTOR.
RICHARD R. WILLIAMS
BY
ATTORNEYS

ANIMAL OILER

BACKGROUND OF THE INVENTION

This invention relates to an animal oiler wherein the liquid flow rate from the tank is primarily controlled by the animal using the oiler.

Several animal oilers are disclosed in the prior art among which are Berens, U.S. Pat. No. 3,306,264; Hesse, U.S. Pat. No. 3,203,400; Hesse, U.S. Pat. No. 2,988,052; Minock, U.S. Pat. No. 2,988,051; Hesse, U.S. Pat. No. 2,983,252; Stonesifer, U.S. Pat. No. 2,663,284; Kalina, U.S. Pat. No. 2,020,063; and Lake U.S. Pat. No. 1,197,215. Common faults among these oilers disclosed by the prior art are intricate valve systems which can easily become clogged under ordinary barnyard conditions; dispensing systems wherein there is no secondary means for controlling maximum flow rate from the tank; and rigidly attached rubbing posts which either break or cause the oiler to tip over when animals rub thereagainst.

The animal oiler of this invention solves all of these problems. This oiler has very few moving parts and the valves are of simple construction and difficult to clog. A seep valve is provided to control the maximum flow rate from the tank and thereby prevent oil waste. The rubbing posts are rotatably and pivotally mounted to minimize breakage of the posts and prevent tipping of the oiler.

SUMMARY OF THE INVENTION

This invention relates to an animal oiler comprising a frame member; a tank mounted on the upper portion of the frame member; at least one distributing pipe connected to and extending downwardly of the tank; at least one normally closed valve means having at least one outlet aperture formed therein connected to each of the distributing pipes; a trough having spaced openings formed therein mounted below the outlet apertures of the valve means; an applicator attached to the trough directly below the spaced openings; rubbing posts rotatably and pivotally mounted on the frame member; and means linking the rubbing posts and the valve means. When the rubbing posts are pivoted from their normal position, the movement is transmitted through the means linking the posts and the valve means, and the valve means is opened. Although oil is the liquid primarily used herein, insecticides, germicides, and the like can also be utilized in this invention.

An object of this invention is to provide an improved animal oiler.

Another object of this invention is to provide an animal oiler with a simple valve system which can not easily be clogged.

A further object of this invention is to provide a secondary means for controlling the maximum liquid flow rate from the tank.

Yet another object of this invention is to provide an animal oiler which is difficult to tip over, and which is not susceptible to breaking.

BRIEF DESCRIPTION OF THE DRAWINGS

FIG. 3 is a side view of the animal oiler;

FIG. 4 is a cross-sectional view of the valve means taken along the line 4—4 of FIG. 2;

FIG. 5 is a cross-sectional view of the upper portion of the animal oiler taken along the line 5—5 of FIG. 3 with the applicator and the tank partially cut away.

DESCRIPTION OF THE PREFERRED EMBODIMENT

Figure 1:
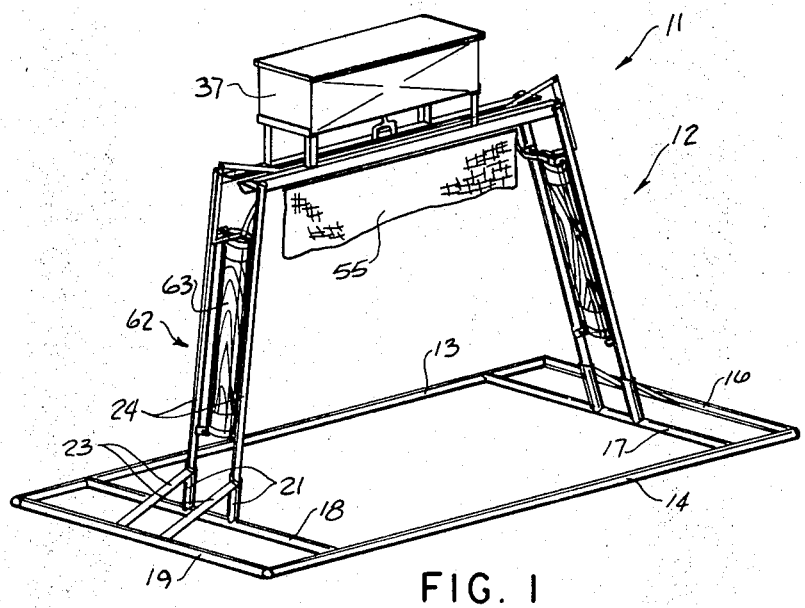
FIG. 1 is a perspective view of the animal oiler of this invention.
Figure 2:
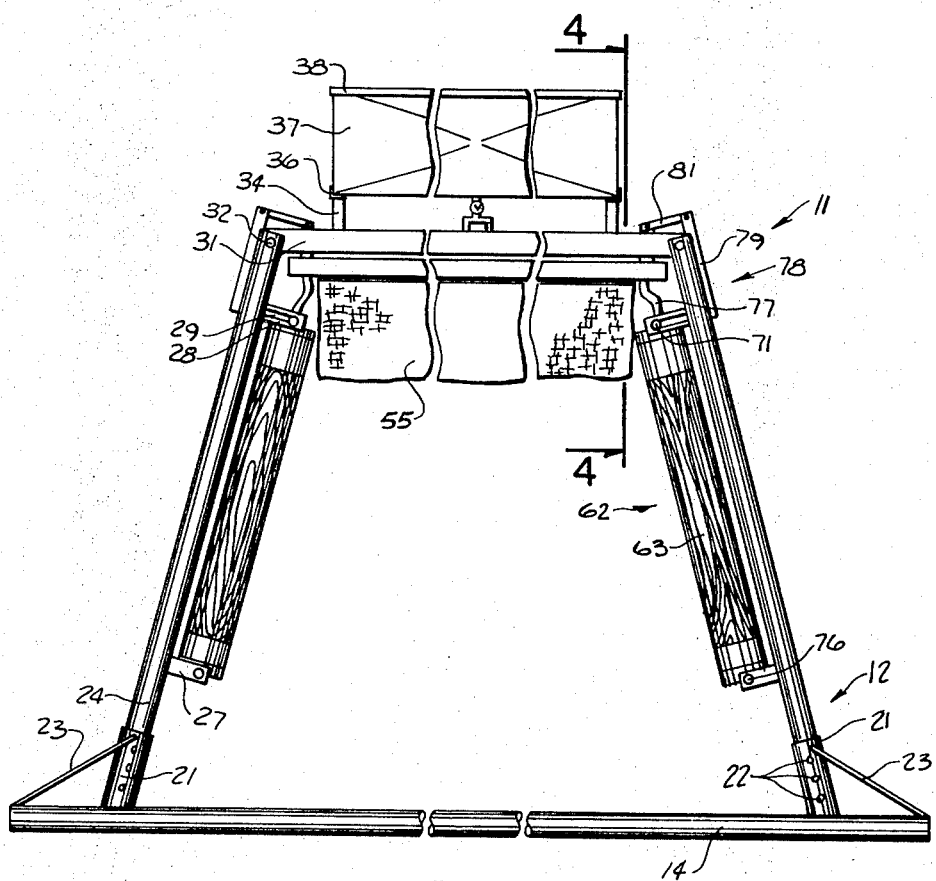
FIG. 2 is a broken front view of the animal oiler.

Referring now to the drawings, the animal oiler of this invention is indicated generally at 11 in FIGS. 1—3. A frame member, generally indicated at 12, comprises the basic superstructure for the animal oiler 11.

The lower portion of the frame member 12 is a base comprised of two longitudinal, parallel members 13, 14 (FIG. 1) and four lateral, parallel members 16, 17, 18, 19. The lateral members 16, 17, 18, 19 are disposed normally of and between longitudinal members 13, 14 and are attached thereto by, for example, welding. These members 13, 14, 16, 17, 18, 19 are formed into a rectangular base which stabilizes the animal oiler 11 of this invention and prevents it from being tipped over by animals rubbing thereagainst.

Two leg receiving means 21 (FIGS. 1—2) are attached, as by welding, to each of the inner, lateral tubular members 17, 18. The leg receiving means 21 are usually substantially cylindrical in configuration and are disposed in a substantially upright position. Each of the leg receiving means has a series of spaced adjustment holes 22 (FIG. 2) formed therein which are utilized to adjust the height of the animal oiler 11. Truss members 23 connect the upper portion of the leg receiving means 21 and the proximate outer, lateral members 16, 19 and thereby hold the leg receiving means 21 rigidly in a substantially upright position.

A leg 24 extends upwardly of each leg receiving means 21. The legs 24 are usually of tubular configuration and the lower ends thereof are adapted to be slidably inserted into the leg receiving means 21. In the lower portion of the legs 24, at least one adjustment hole (not shown) is formed. This hole can be aligned with any of the spaced adjustment holes 22 in the leg receiving means 21 to regulate the overall height of this animal oiler 11. A pin 26 (FIG. 3) is passed through one of the spaced adjustment holes 22 and the aligned adjustment hole in the leg 24 to maintain the desired height.

An ear 27 (FIG. 2) with a hole (not shown) formed horizontally therethrough is rigidly attached to each leg 24 and extends inwardly therefrom. The ears 27 and the holes therethrough on the same side of the animal oiler 11, e.g., mounted on the legs 24 extending above lateral member 18, are aligned to form first journal boxes and are adapted to receive and pivotally mount a shaft (hereinafter described).

An ear 28 (FIGS. 2 and 5) with an elongate slot 29 formed therethrough is rigidly attached to each leg 24 and extends inwardly from the legs 24. The ears 28 and the slots 29 therethrough on the same side of the animal oiler 11 are aligned to form second journal boxes and are adapted to slidably mount and guide a shaft as hereinafter described.

The uppermost ends of the legs 24 on opposite sides of the animal oiler 11, e.g., mounted above lateral members 17, 18 are joined by horizontal and parallel angle members 31 (FIGS. 2 and 4). The horizontal angle members 31 are rigidly attached to the legs 24 with, for example, bolts 32 and nuts 33.

Two spaced apart, vertical, upwardly extending members 34 (FIGS. 2 and 3) are rigidly affixed, as by welding, to each of the horizontal angle members 31. The uppermost ends of the vertical members 34 on the same side of the animal oiler 11 are joined by transverse angle members 36 to form a tank carriage. A tank 37 (FIGS. 2 and 3) is mounted on the transverse angle members 36, for example, by welding. The tank 37 has a removable cover 38 to facilitate filling the tank 37 and to prevent foreign material from entering the system and clogging the valves, etc., which are hereinafter described. The tank 37 can have most any capacity, but a capacity suited for the use, as shown is preferred.

A distributing pipe 39 (FIG. 5) is connected to the tank 37 and extends downwardly therefrom. A seep valve 41 is interconnected in the distributing pipe 39 directly below the tank 37 and is utilized to control the maximum flow rate of liquid from the tank 37. The seep valve 41 can be manually adjusted to regulate the maximum liquid flow rate from the tank 37. Directly below the seep valve 41, the distributing pipe 39 is divided into two branches, each of which empty into the substantially horizontal portion 42 of the distributing pipe 39 which extends downwardly of the seep valve 41. As shown in FIG. 5, the lower portion 42 of the distributing pipe 39 is formed from a single length of pipe and contains a dam 43 intermediate the ends thereof. The dam 43 directs oil or other liquid, to the side of the animal oiler 11 on which the animal is rubbing while holding a supply of oil in reserve for the other side until animals rub thereagainst. The lower portion 42 of the distributing pipe 39 is open at both ends.

At least one normally closed valve means, generally indicated at 44 in FIG. 5, having at least one outlet aperture space 45 formed therein, is connected to each of the distributing pipes 39. As shown in FIG. 5, a valve means 44 is connected at each open end of the lower portion 42 of the distributing pipe 39. The valve means 44 comprises a flat, cylindrical, cover plate 46 which normally covers the open end of the lower portion 42 of the distributing pipe 39. A gasket 46a can be provided on the cover plate 46 to insure a good seal in the normally closed position. A guide means 47 of cylindrical configuration is attached to the cover plate 46 and encircles the end of the lower portion 42 of distributing pipe 39 and is adapted to guide the cover plate 46 to engagement with the open end of the distributing pipe 39. A plurality of holes 48 are advantageously formed through the guide means 47 to facilitate draining of liquid from the distributing pipe 39. Generally, most of the liquid will flow from outlet aperture space 45.

A coil spring 49 is attached, at one end, to the guide means 47 and, at its other end to a horizontal angle member 31. The spring 49 normally holds the cover plates 46 in closed relation with the open ends of the distributing pipe 39. When the cover plate 46 is moved outwardly from the end of the distributing pipe 39, the spring 49 urges the cover plate 46 back to its closed position.

A trough 51 (FIGS. 4 and 5) is mounted on horizontal angle members 31 by fingers 52 which extend from the angle members 31 to the edge of the trough 51. The trough 51 is disposed substantially horizontally and below the plurality of holes 48 in the guide means 47 and the outlet aperture space 45 of the valve means 44. In the lowermost portion of the trough 51, spaced openings 53 are formed therethrough to allow liquid to flow slowly from the trough 51. A dam 54 is disposed across the center of the trough 51 to direct oil to the side of the animal oiler 11 on which the animal is rubbing.

An applicator 55 (FIGS. 4 and 5) is attached to the trough 51 directly below the spaced openings 53. The applicator 55 is attached by means of machine screws 56 (FIG. 5) having large oblong washers 57 thereon; the machine screws 56 are positioned in tapped holes 58. The applicator 55 is formed from an outer layer 59 (FIG. 4) of canvas and an inner layer 61 of absorbent cotton matting, cotton cord, or the like. The oil, or other liquid, is retained or held by the inner layer 61 of absorbent cotton matting until it can be applied to an animal and the canvas outer layer 59 protects the cotton matting from soiling and from the elements.

Rubbing posts, generally indicated at 62 in FIGS. 1—5 are rotatably and pivotally mounted on the frame member 12. The rubbing posts 62 are generally and preferably mounted on the legs 24 of the frame member 12 in a substantially upright position and are pivotally mounted on one end thereof.

The rubbing posts 62 each comprise a post body 63 (FIG. 5) of substantially cylindrical configuration which is preferably formed from oil permeable wood, e.g., pine, spruce, etc. A reservoir 64 is formed in the upper end of the post body 63 and is adapted to receive oil therein. The oil then slowly oozes through the wood and is applied to animals rubbing thereagainst.

A first sleeve 66 (FIG. 5) of substantially cylindrical configuration is rigidly secured around the uppermost end of the post body 63, and extends upwardly of the uppermost end of said post body 63. This sleeve 66 is generally formed from steel although other materials can be used.

A first cylindrical cap member 67 (FIG. 5) is designed to slidably and rotatably mate in the first sleeve 66. An outwardly extending restraining flange 68 is formed around, and is an integral portion of, the first cylindrical cap member 67; the flange 68 rides on the top of the first sleeve 66. A duct 69 is formed through the center of the first cap member 67 and leads into reservoir 64 in post body 63.

A first shaft 71 (FIG. 4) is rigidly affixed on the top of the first cylindrical cap member 67. The shaft 71 is positioned transversely of the legs 24 and is slidably mounted through the elongate slots 29 in the ears 28 of the second journal box. When the rubbing post 62 is pivoted about its lowermost end, the movement of the rubbing post 62 is guided by the second journal box.

A second sleeve 72 of substantially cylindrical configuration is rigidly secured around the lowermost end of the post body 63, and extends downwardly of the lowermost end of the post body 63. This sleeve 72, like first sleeve 66, is generally formed from steel.

A second cylindrical cap member 73 (FIG. 5) is designed to slidably and rotatably mate in the second sleeve 72. An outwardly extending restraining flange 74 is formed around the second cap member 73; the flange 74 bears on the bottom of second sleeve 72.

A second shaft 76 (FIG. 3) is rigidly affixed on the bottom of second cap member 73. The shaft 76 is positioned transversely of the legs 24 and is rotatably mounted in the hole in ear 27 forming the first journal box. The rubbing post 62 is thereby pivotally mounted about its lowermost end.

A tube 77 connects one of the spaced openings 53 in the trough 51 to the duct 69 formed in first cap member 67 to allow oil to flow from the trough 51 into the reservoir 64 in post body 63. The oil which flows into the reservoir 64 is not only applied to the animals rubbing against the post 62 but also lubricates the matting surfaces of first sleeve 66 and first cap member 67. If insecticide or the like is used in this animal oiler instead of oil, this tube can easily be detached and, thereby, prevent liquid from being directed into the post body.

Means linking the rubbing posts 62 and the valve means 44 is generally indicated at 78 in FIGS. 2 and 5. This means 78 opens the valve means 44 when the rubbing post 62 is pivoted from its normal position. The force pivoting the rubbing posts 62 from their normal position is generally supplied by animals rubbing thereagainst.

As shown in FIG. 5, the means 78 linking the rubbing posts 62 and the valve means 44 comprises an L-shaped bracket 79 which is rigidly attached at one end to the first cap member 67. The L-shaped bracket extends outwardly and upwardly of the first cap member 67, and is aligned, in parallel relation, with the lower portion 42 of the distributing pipe 39.

Strut member 81 is pivotally secured to the other end of L-shaped bracket 79 by a rivet 82. The strut member 81 extends from the L-shaped bracket 79 to the guide means 47 of the valve means 44 and is there pivotally secured to an upwardly projecting lug 83 by a rivet 84. The lug 83 is welded to guide means 47.

It can clearly be recognized from the foregoing discussion and the drawings that when the rubbing posts 62 are pivoted from their normal position, the L-shaped bracket 79 is moved outwardly which in turn moves the valve means 44 outwardly from the open end of distributing pipe 39. Oil, or other liquid, is allowed to flow from the open end of the distributing pipe 39 through aperture 45 and into the trough 51. The spring 49 and the weight of the rubbing post 62 both urge the valve means 44 to closed relation with the open end of distributing pipe 39. Oil thereby becomes readily available to and is applied to animals rubbing against the animal oiler 11 of this invention.

Although a preferred embodiment has been described hereinbefore, it is to be remembered that various modifications may be made without departing from the invention as defined in the appended claims.

I. claim:
1. An animal oiler comprising:
   a frame member;
   a tank mounted on the upper portion of said frame member;
   distributing pipe means connected to and extending downwardly of said tank;
   normally closed valve means connected to said distributing pipe means; said valve means having at least one outlet aperture formed therein;

a trough having spaced openings formed therein mounted on said frame member below said outlet apertures of said valve means;

an applicator attached to said trough directly below said spaced openings;

rubbing posts rotatably and pivotally mounted on said frame member; and means linking said rubbing posts and said valve means; said means opening said valve means when said rubbing posts are pivoted from their normal position.

2. The animal oiler of claim 1 wherein said rubbing posts are mounted in substantially upright positions and are pivotally mounted on one end thereof.

3. The animal oiler of claim 2 wherein a seep valve is interconnected in said distributing pipe means intermediate said tank and said valve means; and said seep valve controls the maximum flow rate of liquid from said tank.

4. The animal oiler of claim 3 wherein:

a portion of said distributing pipe means extending downwardly of said seep valve is disposed substantially horizontally;

said trough is disposed substantially horizontally; and said openings in said trough are formed in the lowermost portion of said trough.

5. The animal oiler of claim 4 wherein:

said portion of said distributing pipe means provides an open end extending downwardly of said seep valve; and said valve means comprises:

a cover plate normally covering the open end of said distributing pipe means;

guide means adapted to guide said cover plate to engagement with the open end of said distributing pipe means;

spring means normally holding said cover plate in closed relation with said open end of said distributing pipe means.

6. The animal oiler of claim 5 wherein:

said guide means is cylindrical and encircles the end portion of said distributing pipe means; said guide means being attached to said cover plate; and said guide means has a plurality of holes formed therethrough.

7. The animal oiler of claim 5 wherein said rubbing posts comprise:

a post body of substantially cylindrical configuration formed from oil permeable wood, said post body having a reservoir formed in the upper end thereof;

a first sleeve having a substantially cylindrical configuration rigidly secured around the upper most end of said post body; said first sleeve extending upwardly of the uppermost end of said post body;

a first cylindrical cap member having an outwardly extending restraining flange formed therearound; said first cap member having a duct formed therethrough and being slidably and rotatably mated in said first sleeve;

a second sleeve having a substantially cylindrical configuration rigidly secured around the lowermost end of said post body; said second sleeve extending downwardly of the lowermost end of said post body;

a second cylindrical cap member having an outwardly extending restraining flange formed therearound; said second cap member being slidably and rotatably mated in said second sleeve.